US008537801B2

(12) United States Patent
Calvanese Strinati et al.

(10) Patent No.: US 8,537,801 B2
(45) Date of Patent: Sep. 17, 2013

(54) MULTI-ACCESS TELECOMMUNICATIONS SYSTEM WITH ADAPTED STRATEGY FOR PACKET RETRANSMISSION

(75) Inventors: Emilio Calvanese Strinati, Grenoble (FR); Dimitri Ktenas, Fontaine (FR)

(73) Assignee: Commissariar a l'Energie Atomique et aux Energies Alternatives, Paris (FR)

( * ) Notice: Subject to any disclaimer, the term of this patent is extended or adjusted under 35 U.S.C. 154(b) by 269 days.

(21) Appl. No.: 12/990,444

(22) PCT Filed: Apr. 30, 2009

(86) PCT No.: PCT/EP2009/055246
§ 371 (c)(1),
(2), (4) Date: Oct. 29, 2010

(87) PCT Pub. No.: WO2009/146989
PCT Pub. Date: Dec. 10, 2009

(65) Prior Publication Data
US 2011/0044314 A1    Feb. 24, 2011

(30) Foreign Application Priority Data
Apr. 30, 2008    (FR) .................................... 08 52931

(51) Int. Cl.
*H04B 7/208*    (2006.01)
(52) U.S. Cl.
USPC ........... 370/344; 370/336; 370/350; 370/329; 375/219
(58) Field of Classification Search
USPC ................ 370/336, 350, 329, 334, 208, 229, 370/395.1, 344; 455/452.2, 103, 132; 726/14
See application file for complete search history.

(56) References Cited

U.S. PATENT DOCUMENTS 8,086,242 B2 * 12/2011 Kent et al. ................. 455/452.2
2004/0252693 A1 * 12/2004 Cheriton et al. ........... 370/395.1

FOREIGN PATENT DOCUMENTS

EP    1798926 A     6/2007
EP    1798926 A1 *  6/2007

OTHER PUBLICATIONS

Al Rawi et al., "Opportunistic Uplink Scheduling for 3G LTE Systems", Helsinki University of Technology, Communications Lab, Finland, Wireless Access Networks, Nomadic Lab, Ericsson Research, Finland, submitted as "Prior Art" by the applicant.*

(Continued)

*Primary Examiner* — Andrew Lai
*Assistant Examiner* — Jamaal Henson
(74) *Attorney, Agent, or Firm* — Nixon Peabody LLP (57) ABSTRACT

A wireless OFDMA telecommunications system comprising a transmitter adapted to transmit, by means of an OFDM modulator, a plurality of data packets destined for receivers of a plurality of users, via the same plurality of transmission channels, the transmission channel of a user being associated with a group of sub-carriers of the OFDM multiplex and a set of OFDM symbol times of a transmission interval, each receiver being adapted to signal to the transmitter the loss of a packet transmitted over the transmission channel of the corresponding user, said transmitter further comprising a packet scheduler adapted to control retransmission of each packet lost by means of said modulator. Each receiver comprises detection means of an outage situation of the transmission channel of the corresponding user and signals this to said transmitter by means of an outage information (OUTAGE/NOUTAGE). In the event of outage, said scheduler prohibits any retransmission of a packet lost over said channel during a predetermined time ($T_{out}$) greater than or equal to the coherence time of said channel.

8 Claims, 3 Drawing Sheets

(56) References Cited

OTHER PUBLICATIONS

International Search Report in International Application No. PCT/EP2009/055246, mailed Jun. 15, 2009.

International Preliminary Report on Patentability in International Application No. PCT/EP2009/055246, dated Apr. 22, 2010.

French Search Report in French Application No. 0852931, dated Feb. 26, 2009.

Al-Rawi, M. et al., "Opportunistic Uplink Scheduling for 3G LTE Systems," The IEEE International Conference on Innovations in Informational Technology, Nov. 2007, pp. 705-709, XP031226586.

Biglieri, E. et al., "Fading Channels: Information-Theoretic and Communications Aspects," IEEE Transactions on Information Theory, vol. 44, No. 6, Oct. 1998, pp. 2619-2692.

Maeda, N. et al., "Experimental evaluation of throughput performance in broadband packet wireless access based on VSF-OFCDM and VSF-CDMA," The 14th IEEE 2003 International Symposium on Personal, Indoor and Mobile Radio Communication Proceedings, 2003, vol. 1, pp. 6-11.

\* cited by examiner

MULTI-ACCESS TELECOMMUNICATIONS SYSTEM WITH ADAPTED STRATEGY FOR PACKET RETRANSMISSION

CROSS REFERENCE TO RELATED APPLICATIONS OR PRIORITY CLAIM

This application is a national phase of International Application No. PCT/EP2009/055246, entitled "MULTIPLE ACCESS TELECOMMUNICATION SYSTEM WITH ADAPTED PACKET-RETRANSMISSION STRATEGY", which was filed on Apr. 30, 2009, and which claims priority of French Patent Application No. 08 52931, filed Apr. 30, 2008.

DESCRIPTION

1. Technical Field

The present invention relates to the field of multi-access telecommunications systems and, more particularly, OFDMA telecommunications systems (Orthogonal Frequency Division Multiple Access).

2. Prior Art

Multi-access telecommunications systems share a transmission resource between different users so as to provide each of them with a distinct transmission channel. The techniques of TDMA (Time Division Multiple Access), FDMA (Frequency Division Multiple Access) and CDMA (Code Division Multiple Access) are well known, which share the transmission resource by allocating time intervals respectively, frequency/frequency intervals, or access codes to the different users. It is also conventional to combine these access control techniques together. For example, an OFDMA system (Orthogonal Frequency Division Multiplexing Access) combines frequency division access (FDMA) and time division access (TDMA). In such a system, for each time interval, each user is dynamically allocated a set of sub-carriers from an OFDM multiplex over which he can transmit his data. This access control technique is used especially in the standard IEEE 802.16, commonly designated by the name WiMAX.

Sharing the transmission resource between the different users is the role of the MAC (Medium Access Control) protocol layer, the sub-layer of the link layer forming the interface with the physical layer. In the abovementioned OFDMA system, the MAC layer allocates a set of sub-carriers to each data packet to be transmitted by a user during a time interval. The MAC layer also manages possible retransmission of packets lost as a result of errors due to the transmission channel. Dynamic allocation of sub-carriers (Dynamic Sub-carrier Assignment) and retransmission of packets are executed by an algorithm known by the expression "packet scheduler".

The allocation of frequencies in an OFDMA system is capable of supporting different types of quality of service (QoS). For quality of service of best effort type (Best Effort), the distribution of the transmission resource can be equitable (fair scheduling) by ensuring the same instantaneous rate to different users, or else proportional (proportional fair scheduling) by maximising the total instantaneous rate of the different users while ensuring a minimum level of service. For real-time quality of service (that is, with minimal latency), other allocation techniques are used (MSR or Maximum Stability Region), maximising the rate of a user as an average value.

Figure 1:
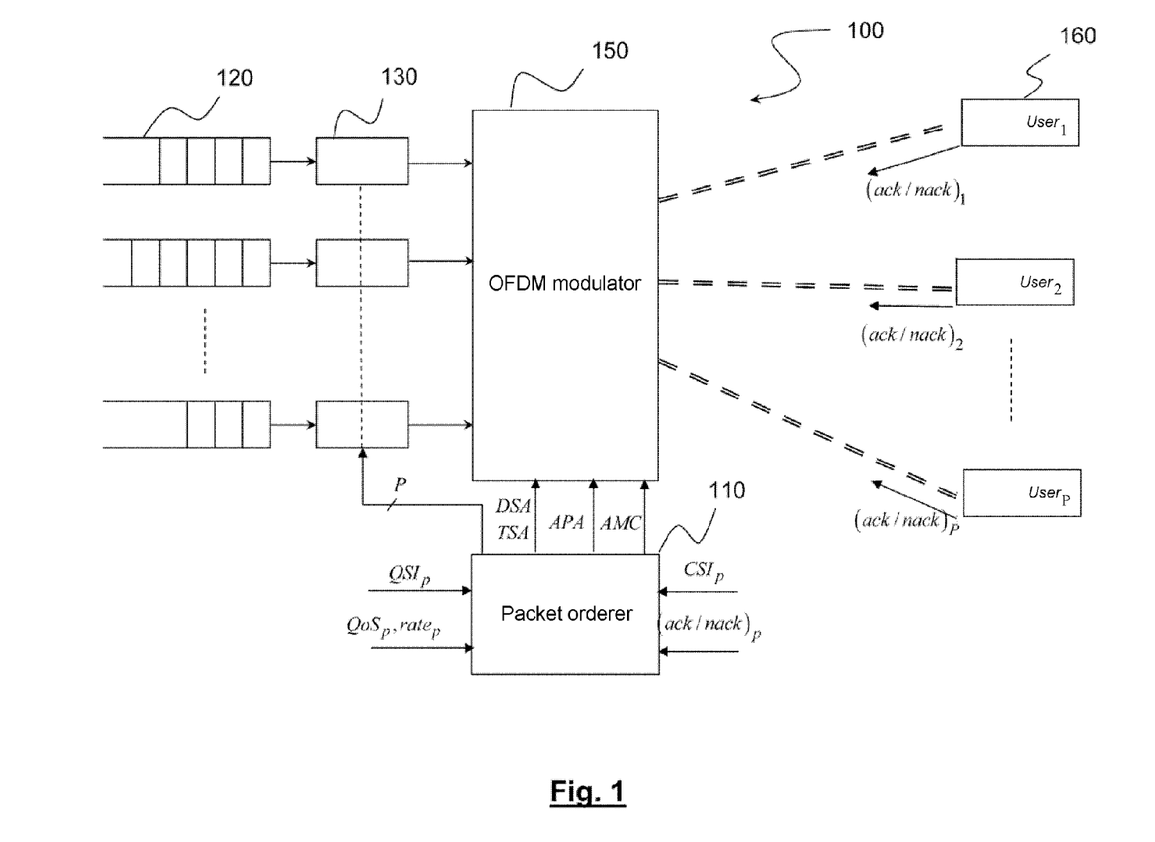
FIG. 1 schematically illustrates an OFDMA telecommunications system known from the state of the art.

FIG. 1 schematically illustrates an OFDMA system comprising a transmitter 100 and a plurality of receiver terminals 160 associated with different users. The transmitter comprises an OFDM modulator 150 and a packet scheduler 110.

A packet queue 120 and a transmission buffer 130 correspond to each user $p=1, \ldots, P$. The scheduler 110 executes dynamic allocation of resources for each transmission time interval (TTI), each interval being divided into a plurality of OFDM symbol times. More precisely, the scheduler 110 dynamically allocates for each of the users a subset of carriers and a subset of OFDM symbol times, as a function of the quality of service $QoS_p$, the length of the queue $QSI_p$ (Queue State Information) and, if necessary, of the required rate $rate_p$, of each user. In addition to dynamic allocation of sub-carriers (DSA) and of OFDM symbol times (TSA), the scheduler can also control the power sent to each group of sub-carriers (Adaptive Power Allocation or APA) as well as the MCS modulation and coding scheme (Modulation and Coding Scheme) used for each sub-group (Adaptive Modulation and Coding or AMC). For the purpose of allocation dynamic or power control/MCS scheme, the scheduler can also take into account the status information of the channel of each user CSI (Channel State Information) representing the complex attenuation coefficient over the channel.

At each transmission interval, the modulator 150 receives the packets from the different users and completes OFDM modulation of these packets, in consideration of the groups of sub-carriers, subsets of symbol times, powers and MCS schemes allocated by the scheduler 110 to different users.

When a user packet is transmitted over the transmission channel, this packet is not immediately purged, but remains stored in the transmission buffer awaiting positive acknowledgement (ACK) or negative acknowledgement (NACK) from the receiver. In the event of negative acknowledgement or of lack of positive acknowledgement over a certain period, the transmitter retransmits the packet according to a protocol known as ARQ (Automatic Repeat reQuest). Several types of ARQ protocols are known from the state of the art, especially the Stop-and-Wait, Go-Back-N, SR-ARQ (Selective Request ARQ) protocols.

As a general rule, the packets are coded using coding known as FEC (Forward Error Correction) which can take the form of an error detection code (EDC) or error correction code (ECC), before being modulated and sent. If the receiver detects in a packet the presence of an error which he cannot correct, he transmits a negative acknowledgement (NACK) to the transmitter. The combination of FEC coding and ARQ retransmission protocol is known in the literature under the acronym HARQ (Hybrid ARQ). There are currently several versions of HARQ protocol.

In the simpler version, known as HARQ Type I, when an error cannot be corrected in a packet, a retransmission request for the erroneous packet is sent to the transmitter and a second transmission attempt takes place. In practice, the erroneous packet is not deleted but is stored in a reception buffer where it is combined (Chase combining) with the block received on the second attempt. The result of the combination is then subjected to the decoder.

A second version of HARQ protocol, called HARQ Type II or IR HARQ (Incremental Redundancy HARQ) reduces the size of retransmitted packets. According to this version, during initial transmission of the packet, the code is punctured such that few redundancy bits are transmitted. If the packet received during initial transmission proves to be erroneous and cannot be corrected using available redundancy bits, then additional redundancy bits eliminated during puncturing are transmitted in response to the first retransmission request. The process can be repeated, the redundancy bits being transmitted incrementally, throughout retransmission requests, for as long as the erroneous block cannot be corrected.

In the context of the OFDMA telecommunications system of FIG. 1, the retransmission protocol of packets of ARQ or HARQ type is managed by the scheduler 110. It receives the negative/positive acknowledgements (ack/nack)$_p$ from each user p=1, . . . , P and for each packet transmitted. If a packet is lost for a user, it decides its retransmission according to ARQ protocol.

The OFDMA system described previously is satisfactory for wire links but can have severe limitations for radio channels selective in frequency. Here, channel selective in frequency means a channel having bandwidth of narrower consistency than the pass-band of the signal transmitted. In the case of such a channel, if fading relates to a group of sub-carriers, the packets modulated by these sub-carriers have a high probability of being lost. If ARQ or HARQ retransmission occurs during this same fading, the retransmitted packets risk undergoing the same fate. These retransmissions uselessly burden the energy budget of the transmitter and result in augmentation of the latency which can prove to be incompatible with a quality of service of real-time type.

The aim of the present invention is consequently to propose an OFDMA telecommunications system capable of detecting and rectifying the occurrence of selective frequency fading without augmentation of the power output of the transmitter or of the latency of the packets.

EXPLANATION OF THE INVENTION

The present invention is defined by a wireless OFDMA telecommunications system comprising a transmitter adapted to transmit, by means of an OFDM modulator, a plurality of data packets destined for receivers from a plurality of users, via the same plurality of transmission channels, the transmission channel of a user being associated with a group of sub-carriers of the OFDM multiplex, and to a set of OFDM symbol times of a transmission interval. Each receiver is adapted to signal to the transmitter the loss of a packet transmitted over the transmission channel of the corresponding user. Said transmitter further comprises a packet scheduler adapted to control retransmission of each packet now lost by means of said modulator. Each receiver comprises detection means of an outage situation of the transmission channel of the corresponding user, said outage situation being signalled to said transmitter by means of outage information (OUTAGE/NOUTAGE), and, in the event of outage, said scheduler prohibits any retransmission of a packet lost over said channel during a predetermined time ($T_{out}$) greater than or equal to the coherence time of said channel.

According to a first variant embodiment, said scheduler authorises retransmission of the packet lost over said transmission channel in terms of said predetermined time.

According to a second variant embodiment, in an outage situation, said scheduler allocates to said user a second channel associated with a second group of sub-carriers distinct from that of the channel in an outage situation, and to said set of OFDM symbol times.

According to a third variant embodiment, in an outage situation, if the packet lost corresponds to a real-time flow, said scheduler allocates to said user a second channel associated with a second group of sub-carriers distinct from that of the channel in an outage situation as well as to said set of OFDM symbol times, and, if not, said scheduler authorises retransmission of the packet lost over said channel in an outage situation in terms of said predetermined time.

According to a fourth variant embodiment, in an outage situation, if the packet lost has a TTL value of less than a predetermined threshold, said scheduler allocates to said user a second channel associated with a second group of sub-carriers distinct from that of the channel in an outage situation as well as to said set of OFDM symbol times, and, if not, said scheduler authorises retransmission of the lost packet over said channel in an outage situation in terms of said predetermined time.

Advantageously, said outage detection means detect outage of the channel when the instantaneous mutual information from this channel is less than the binary rate to be transmitted over this channel.

According to a first embodiment, said outage detection means estimate the instantaneous mutual information from:

$$I_{inst} = \frac{\gamma}{n_t n_c} \sum_{j=1}^{n_t} \sum_{i=1}^{n_c} |h_{ij}|^2$$

where $\gamma$ is the signal-to-noise ratio over the channel, $n_c$ and $n_t$ are respectively the number of sub-carriers and the number of OFDM symbol times allocated to the user per transmission interval, $h_{ij}$, i=1, . . . $n_c$, j=1, . . . , $n_t$, are the attenuation coefficients of the transmission channel affecting the different sub-carriers during the different OFDM symbol times.

According to a second embodiment, said outage detection means estimate the instantaneous mutual information from:

$$I_{inst} = \frac{1}{n_t n_c} \sum_{j=1}^{n_t} \sum_{i=1}^{n_c} I_{ij}$$

with $$I_{ij} = \log Q - \frac{1}{Q} \sum_{k=1}^{Q} E_z \left\{ \log \left( \sum_{q=1}^{Q} \exp\left[ -\frac{|h_{ij}a_k + z - h_{ij}a_q|^2 - |z|^2}{2\sigma^2} \right] \right) \right\}$$

where the $a_q$=1, . . . , Q are the symbols of the modulation alphabet utilised for modulating the sub-carriers, $n_c$ and $n_t$ are respectively the number of sub-carriers and the number of OFDM symbol times allocated to the user per transmission interval, $h_{ij}$, i=1, . . . $n_c$, j=1, . . . , $n_t$, are the attenuation coefficients of the transmission channel affecting the different sub-carriers during the different OFDM symbol times, $z=N(0,\sigma^2)$ the variable random describing the noise and $E_z(.)$ is the expectancy on the noise samples.

Advantageously, said coherence time of the channel is determined from estimation of the Doppler offset affecting said channel.

BRIEF DESCRIPTION OF THE DIAGRAMS

Other characteristics and advantages of the invention will emerge from a preferred embodiment of the invention given in reference to the attached figures, in which.

DETAILED EXPLANATION OF PARTICULAR EMBODIMENTS

A first idea based on the invention is to enable the OFDMA system to diagnose an outage situation in terms of the theory of the information. A second idea based on the invention is to prohibit retransmission of packets in a transmission channel affected by an outage situation during a period greater than or equal to the coherence time of this channel.

A wireless OFDMA system is considered as previously where each user is allocated at each transmission interval (TTI), a group of sub-carriers and a subset of OFDM symbol times, for transmitting a data packet. The transmission interval can be equal to one or more OFDM symbol times (typically 7 or 14 OFDM symbols). The transmission channel used by the OFDM signal is a radio channel.

In general, a channel radio is not ergodic, but can be modelled in the form of a fading channel by blocks (block fading channel). In the case of radio transmission of OFDM type, a block could be defined by a time interval and a group of sub-carriers, generally contiguous. An instance of the channel generally characterised by the complex value of an attenuation coefficient corresponds to each block. The attenuation coefficients of the different blocks can be considered as the results of outcomes of a random variable.

The capacity in terms of Shannon, expressed as an average of the mutual information in all instances of the channel, is not a pertinent variable for characterising a non-ergodic channel. As explained in the article by E. Biglieri et al. entitled "Fading channels: information-theoretic and communication aspects" published in IEEE Trans. on Information Theory, vol. 44, No. 6, October 1998, pages 2619-2692, it is preferable to characterise this channel by an outage probability. Outage occurs when the capacity associated with the instance of the channel is less than the binary transmission rate of the source.

The outage probability depends on the signal-to-noise ratio $\gamma$ and on the binary transmission rate R of the source, or:

$$P_{out}(\gamma, R) = Pr(I(X, Y) < R) \quad (1)$$

The outage probability can be considered as the probability that the "instantaneous" mutual information of the channel, seen by a packet, is less than binary transmission rate. If the latter is less than this rate, it will not be possible to correct errors affecting a packet. However, in making a parallel with the fundamental Shannon theorem, since the "instantaneous" mutual information of the channel is greater than this rate, it will still be possible to use an error correction code for transmitting the data with an arbitrarily low error probability.

Reference is again made to the case of the above OFDMA system and more particularly of the transmission channel of a user associated with a group of $n_c$ sub-carriers and a subset of OFDM symbol times during a transmission interval. For the sake of simplicity, it is assumed that the group of sub-carriers is identical for said different OFDM symbol times. However, groups of different sub-carriers can be allocated for different symbol times without departing from the scope of the present invention.

The "instantaneous" mutual information of the channel, that is, "observed" for transmission of the packet, can be evaluated by means of:

$$I_{inst} = \frac{1}{n_t n_c} \sum_{j=1}^{n_t} \sum_{i=1}^{n_c} I_{ij} \quad (2)$$

where $I_{ij}$ is the average mutual information calculated for the carrier i during the $j^{th}$ OFDM symbol time, $n_t$ is the number of OFDM symbols during this interval (with $n_t \geq 1$). The behaviour of the channel on a carrier can be considered, apart from the complex attenuation coefficient, as being of BBAG type (that is, Gaussian Additive White Noise [GAWN]).

It is assumed that the symbols of a data packet modulating the $n_c$ sub-carriers belong to a Q-ary alphabet. The receiver knows by means of a channel estimator the complex attenuation coefficients $h_{ij}$ affecting the different sub-carriers during transmission of the $j^{th}$ OFDM symbol time. Generally, the channel estimator performs an estimation of some complex attenuation coefficients at different moments of the transmission interval and for different sub-carriers, the other coefficients being determined by time and/or frequency interpolation.

The channel estimator can conventionally use detection of pilot symbols distributed over the sub-carriers in the framework of OFDM symbols. Alternatively, the channel estimator can be of the decision-aided type (decision-aided channel estimation) as known per se.

The detection of pilot symbols also produces estimation of the noise variance $\sigma^{-2}$. It can be shown that the average mutual information $I_{ij}$ is expressed by:

$$I_{ij} = \log Q - \frac{1}{Q} \sum_{k=1}^{Q} E_z \left\{ \log \left( \sum_{q=1}^{Q} \exp \left[ -\frac{|h_{ij} a_k + z - h_{ij} a_q|^2 - |z|^2}{2\sigma^2} \right] \right) \right\} \quad (3)$$

where the $a_q = 1, \ldots, Q$ are the symbols of the modulation alphabet modulating the sub-carriers during the OFDM symbol time considered, $z = N(0, \sigma^2)$ is the random variable describing noise on the sub-carrier and $E_z(.)$ is the expectancy on the noise samples.

Instead of estimating the "instantaneous" mutual information of the channel from (2) and (3), it is possible to evaluate it empirically and approximately by:

$$I_{inst} = \frac{\gamma}{n_t n_c} \sum_{j=1}^{n_t} \sum_{i=1}^{n_c} |h_{ij}|^2 \quad (4)$$

As already indicated earlier, if $I_{inst}$, such as obtained by (2) and (3), or (4) is less than the transmission rate R of the user, the channel will be in an outage situation and errors affecting packet data will not all be able to be corrected.

The receiver can calculate the value $I_{inst}$ by means of a look-up table from the values $\gamma$, $n_c$, $n_t$ and $h_{ij}$, $i=1, \ldots, n_c$, $j=1, \ldots, n_t$ and compare them to the rate for diagnosing an outage situation. If an outage situation is detected, it alerts the transmitter, for example by means of a signalling bit. The receiver in fact sends two bits over the return link, a first positive or negative ACK/NACK acknowledgement bit for good reception of the packet and a second OUTAGE/NOUTAGE bit indicating, in the event of negative acknowledgement whether poor reception of the packet is due to an outage situation of the channel.

The ACK/NACK and OUTAGE/NOUTAGE bits sent by each receiver are used by the scheduler of the OFDMA transmitter to manage retransmission of packets. More precisely, if an outage situation is detected for the transmission channel of a user, the scheduler will prohibit any packet transmission or retransmission over a channel which had been allocated to the user, during a period $T_{out}$ greater than or equal to the coherence time of the channel $T_{coh}$. In fact, packet transmission/retransmission during this coherence time would have a high probability of again causing loss of the packet.

The coherence time of the channel $T_{coh}$ can be obtained in various ways. For example, it can be estimated from the Doppler offset $f_d$ undergone by the signal radio by means of:

$$T_{coh} = \frac{1}{\pi\sqrt{2}\,f_d} \tag{5}$$

The Doppler offset could be obtained as indicated in the article by N. Maeda et al. entitled "Experimental Evaluation of Throughput Performance in Packet Wireless Access Based on VSF-OFDM and VSD-CDMA", IEEE PIRMC '03, that is, from correlation between pilot symbols of the same carrier belonging to successive OFDM symbols. Alternatively, the coherence time could be obtained from the cyclic correlation function of the OFDM signal received over the transmission channel (uplink or downlink). In the event where the transmission channel is of FDD (Frequency Division Duplex) type, that is, if the uplink and the downlink use different frequency carriers, it is easy to deduce the Doppler offset of one relative to the Doppler offset of the other.

It is assumed that the OFDMA transmitter has received negative reception acknowledgement for a packet transmitted over the transmission channel of a user. The transmission channel is associated with a first group of sub-carriers.

According to a first variant, if the scheduler is warned of an outage situation (OUTAGE) of the transmission channel, it prohibits any packet retransmission over said channel during the time $T_{out}$ and allocates to the user in question, for the same subset of OFDM symbol times previously allocated, a second group of sub-carriers distinct from the first for retransmission of the lost packet, for example during the following transmission interval (TTI). At the end of the time $T_{out}$ the first group of sub-carriers is again available to be allocated to said user (for the same subset of OFDM symbol times). It is evident that in the meantime the first group of sub-carriers could be allocated to another user inasmuch as the transmission channels of the different users are distinct.

According to a second variant, if the scheduler is warned of an outage situation of the transmission channel, it inhibits as previously any retransmission of the lost packet over the channel during the time $T_{out}$ but authorises retransmission of the packet lost at the end thereof. As for the first, this second variant prevents any retransmission bound to fail but introduces additional latency.

The scheduler can opt for the first or the second variant as a function of the real-time character of the quality of service required and/or of the life span or TTL (Time To Live) of the packet to be transmitted, that is, of the maximum time authorised for it to be delivered and, if necessary decoded, to its destination.

Figure 2:
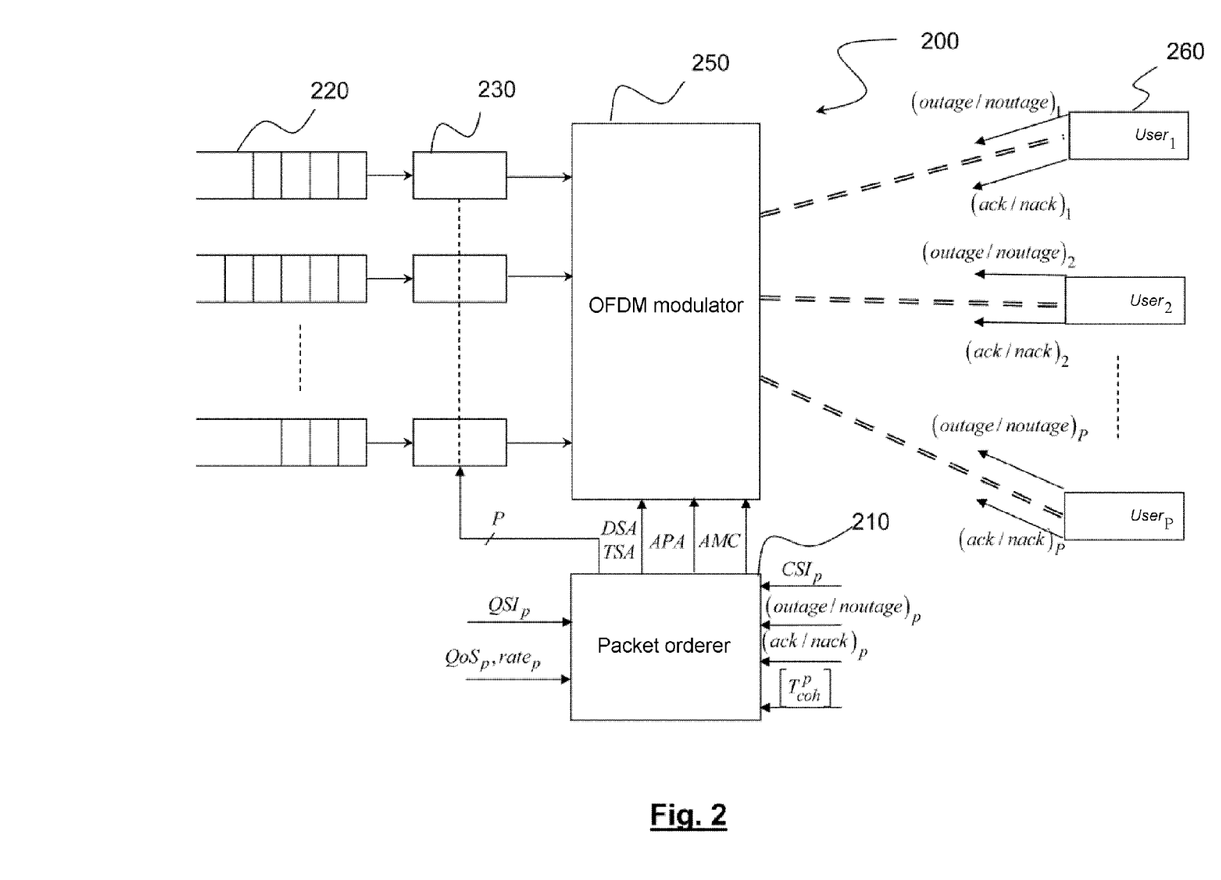
FIG. 2 schematically illustrates an OFDMA telecommunications system according to an embodiment of the invention.

FIG. 2 schematically illustrates an OFDMA telecommunications system 200 according to an embodiment of the invention. The references representing entities identical to those of FIG. 1 are augmented by 100.

Compared to the OFDMA system of the state of the art, the packet scheduler 210 receives from each user p a bit (outage/noutage)$_p$ indicating whether the transmission channel of this user is or is not in an outage situation. The outage situation is detected by comparing the instantaneous mutual information $I_{inst}^p$ of this channel to the required binary rate $R^p$, knowing that if $I_{inst}^p < R^p$ an outage is diagnosed.

In the event of packet loss over the channel of a user p, indicated by the bit (ack/nack)$_p$ the scheduler 210 decides, as a function of the value of the bit (outage/noutage)$_p$, whether retransmission of the lost packet can be carried out over the channel. According to the first variant above, the scheduler proceeds with immediate reallocation of resources, in this case reallocates a group of sub-carriers for the same subset of OFDM symbol times previously allocated to the user, whereas in the second variant, the scheduler suspends any retransmission over the channel during a period greater than or equal to the coherence time of the channel $T_{coh}^p$.

The coherence time $T_{coh}^p$ estimated either via the terminal of the user p from the signal transmitted over the descending link, or via the base station from the signal transmitted over the ascending link. In the first case, the information of coherence time is transmitted via a return path from the user as (ack/nack)$_p$ and (outage/noutage)$_p$.

The scheduler 210 can optionally control the power transmitted over each sub-carrier or group of sub-carriers (APA) and the modulation and coding scheme (AMC) as a function of the status of transmission channel given by the status information of the channel CSI$_p$. This control is however carried out only for those channels not in an outage situation.

Figure 3:
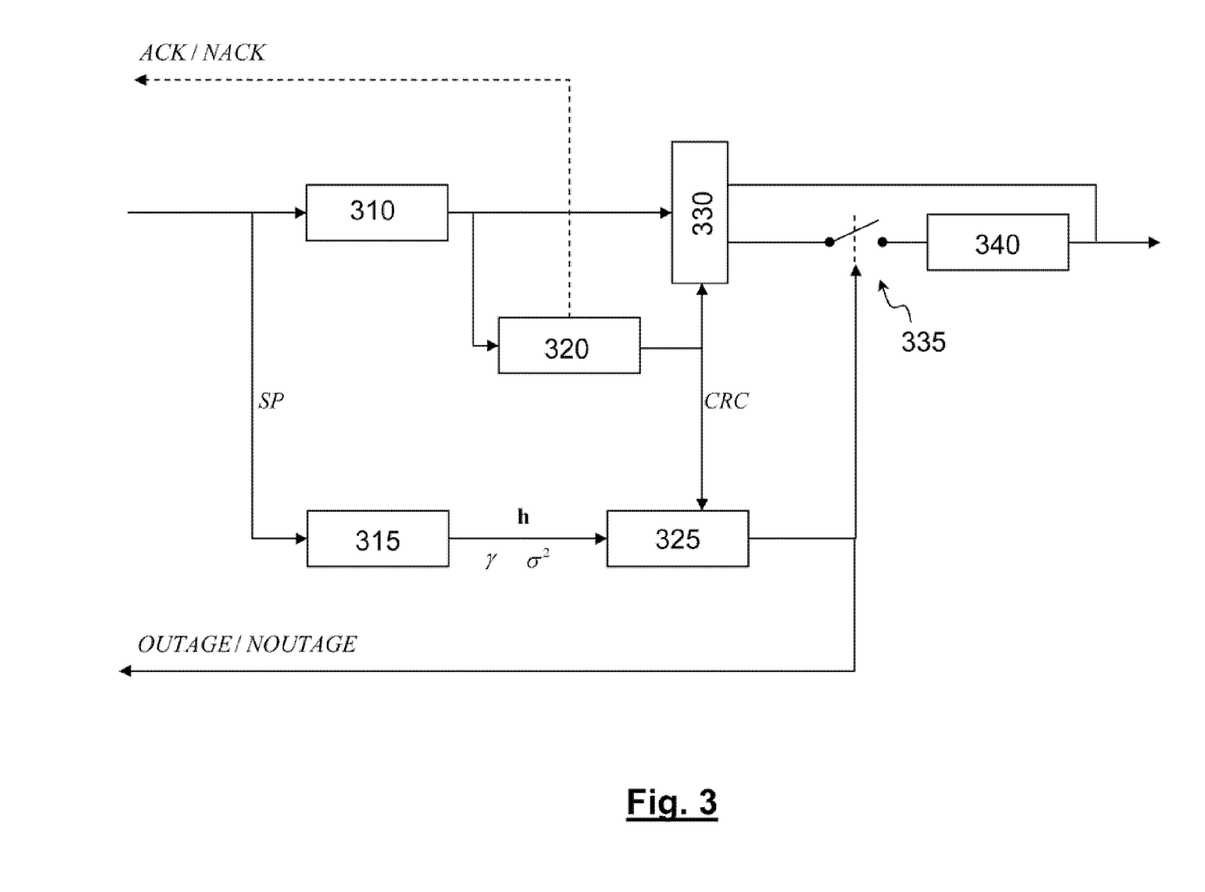
FIG. 3 schematically illustrates the structure of a receiver for the OFDMA telecommunications system of FIG. 2.

FIG. 3 schematically illustrates the structure of a receiver for an OFDMA telecommunications system according to an embodiment of the invention.

The OFDM symbols received by the receiver are demodulated in the demodulator 310. The code word or the code words constituting the data packet are then submitted to CRC 320 calculation means. These means determine whether the packet is erroneous and transmit this information to the multiplexer 330 as well as to the outage detection means of channel 325. If the packet is devoid of error, it is transmitted directly to the output. If not, it is transmitted to the switching means 335. Via a ACK/NACK signal on the return path, the calculation means 320 also inform as to whether the packet received is erroneous or not.

The channel estimator 315 estimates the attenuation coefficients $h_{ij}$ of the different sub-carriers from the pilot symbols SP and transmit them to the outage detection means 325. The latter also receive from the channel estimator the estimation of the signal-to-noise ratio $\gamma$ and/or of the noise power $\sigma^2$ and calculate by way of the expressions (2) and (3) or else (4) the "instantaneous" mutual information $I_{inst}$.

The noise power $\sigma^2$ can be determined by the estimator channel by means of the pilot symbols received and the corresponding non-noisy pilot symbols. If $p_i$ represent the pilot symbols sent and $\hat{H}_i$ represents an estimation of the coefficients of the channel, the noise samples, and therefore their variance could be determined for example from $\hat{z}_i = y_i - \hat{H}_i p_i$ where $y_i$ are the corresponding signals received. In practice, it is easy to estimate the distance of the signals received, after equalising, from the points of the modulation constellation and deduce from this distance the noise variance.

The signal-to-noise ratio can also be conventionally obtained as a function of the binary error rate by means of conversion graphs (in a look-up table) BER=f(S/N).

The means 325 also know the MCS scheme used (for example by means of a signalling channel) and deduce therefrom the transmission binary rate R.

The means 330 check whether $R > I_{inst}$, and alert the transmitter thereof via the OUTAGE/NOUTAGE signal. This same signal controls the switching means 335. According to whether the channel is in an outage situation or not, the switching means inhibit or transmit the erroneous packet to the ECC decoder 340. The decoding operation will therefore not be carried out ineffectively, since in an outage situation the latter would be bound to fail.

The invention claimed is:
1. A wireless OFDMA telecommunications system comprising a transmitter adapted to transmit, by means of a

OFDM modulator, a plurality of data packets destined for receivers of a plurality of users, via a same plurality of non-ergodic transmission channels as the plurality of data packets, the transmission channel of a user being associated with a group of subcarriers of the OFDM multiplex, and a set of OFDM symbol times of a transmission interval, each receiver being adapted to signal to the transmitter a loss of a packet transmitted over a transmission channel of a corresponding user, said transmitter further comprising a packet scheduler adapted to control retransmission of each lost packet by means of said modulator, characterized in that each receiver comprises detection means of an outage situation of the transmission channel of the corresponding user, said outage detection means detecting an outage of the transmission channel when an instantaneous mutual information on the transmission channel is less than a binary rate to be transmitted over the transmission channel, said outage situation being signaled to said transmitter by means of outage information (OUTAGE/NOUTAGE), and in that in the event of the outage, said scheduler prohibits any retransmission of a lost packet over said transmission channel during a predetermined time (Tout) greater than or equal to the coherence time of said transmission channel.

2. The OFDMA telecommunications system as claimed in claim 1, characterized in that in the event of the outage, said scheduler authorizes retransmission of the lost packet over said transmission channel at the end of said predetermined time.

3. The OFDMA telecommunications system as claimed in claim 1, characterized in that in the event of the outage, said scheduler allocates to said user a second channel associated with a second group of sub-carriers distinct from that of the channel in an outage situation, and to said set of OFDM symbol times.

4. The OFDMA telecommunications system as claimed in claim 1, characterized in that in an outage situation, if the lost packet corresponds to a real time flow, said scheduler allocates to said user a second channel associated with a second group of sub-carriers distinct from that of the channel in an outage situation as well as with said set of OFDM symbol times, and, if not, said scheduler authorizes retransmission of the lost packet over said transmission channel in an outage situation after said predetermined time.

5. The OFDMA telecommunications system as claimed in claim 1, characterized in that in an outage situation, if the lost packet has a TTL value less than a predetermined threshold, said scheduler allocates to said user a second channel associated with a second group of sub-carriers distinct from that of the channel in an outage situation as well as with said set of OFDM symbol times, and, if not, said scheduler authorizes retransmission of the lost packet over said transmission channel in an outage situation after said predetermined time.

6. The OFDMA telecommunications system as claimed in claim 1, characterized in that said outage detection means estimate the instantaneous mutual information from:

$$I_{inst} = \frac{\gamma}{n_t n_c} \sum_{j=1}^{n_t} \sum_{i=1}^{n_c} |h_{ij}|^2$$

where $\gamma$ is the signal-to-noise ratio over the channel, $n_c$ and $n_t$ are respectively the number of sub-carriers and the number of OFDM symbol times allocated to the user per transmission interval, $h_{ij}$, $i=1, \ldots n_c$, $j=1, \ldots, n_t$ are the attenuation coefficients of the transmission channel affecting the different sub-carriers during the different OFDM symbol times.

7. The OFDMA telecommunications system as claimed in claim 1, characterized in that said outage detection means estimate the instantaneous mutual information from:

$$I_{inst} = \frac{1}{n_t n_c} \sum_{j=1}^{n_t} \sum_{i=1}^{n_c} I_{ij}$$

with $$I_{ij} = \log Q - \frac{1}{Q} \sum_{k=1}^{Q} E_z \left\{ \log \left( \sum_{q=1}^{Q} \exp\left[ -\frac{|h_{ij}a_k + z - h_{ij}a_q|^2 - |z|^2}{2\sigma^2} \right] \right) \right\}$$

where the $a_q = 1, \ldots, Q$ are the symbols of the modulation alphabet used to modulate the sub-carriers, $n_c$ and $n_t$ are respectively the number of sub-carriers and the number of OFDM symbol times allocated to the user per transmission interval, $h_{ij}$, $i=1, \ldots n_c$, $j=1, \ldots, n_t$, are the attenuation coefficients of the transmission channel affecting the different sub-carriers during the different OFDM symbol times, $z = N(0, \sigma^2)$ the random variable describing noise and $E_z(.)$ is the expectancy on the noise samples.

8. The OFDMA telecommunications system as claimed in claim 1, characterized in that said coherence time of the channel is determined from an estimation of the Doppler offset affecting said channel.

\* \* \* \* \*

UNITED STATES PATENT AND TRADEMARK OFFICE
CERTIFICATE OF CORRECTION

PATENT NO.       : 8,537,801 B2
APPLICATION NO.  : 12/990444
DATED            : September 17, 2013
INVENTOR(S)      : Calvanese Strinati et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

Signed and Sealed this
Fifteenth Day of September, 2015

Michelle K. Lee
*Director of the United States Patent and Trademark Office*